United States Patent
Karlsson

(10) Patent No.: US 9,709,149 B2
(45) Date of Patent: Jul. 18, 2017

(54) DRIVEN AXLE GEAR FOR A MOTOR VEHICLE

(71) Applicant: SCANIA CV AB, Södertälje (SE)

(72) Inventor: Stefan Karlsson, Rönninge (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/403,664

(22) PCT Filed: May 23, 2013

(86) PCT No.: PCT/SE2013/050588
§ 371 (c)(1),
(2) Date: Nov. 25, 2014

(87) PCT Pub. No.: WO2013/180626
PCT Pub. Date: Dec. 5, 2013

(65) Prior Publication Data
US 2015/0167812 A1  Jun. 18, 2015

(30) Foreign Application Priority Data
May 28, 2012 (SE) ...................... 1250544

(51) Int. Cl.
*F16H 57/02* (2012.01)
*F16H 48/40* (2012.01)
(Continued)

(52) U.S. Cl.
CPC ............. *F16H 48/40* (2013.01); *B60B 35/18* (2013.01); *F16H 57/021* (2013.01);
(Continued)

(58) Field of Classification Search
CPC ...... F16H 48/40; F16H 57/037; F16H 57/021; F16H 2048/405; F16H 2057/02043;
(Continued)

(56) References Cited

U.S. PATENT DOCUMENTS 2,510,996 A * 6/1950 Morgan .................. F16H 48/08
475/230
3,202,466 A 8/1965 Kaptur
(Continued)

FOREIGN PATENT DOCUMENTS

DE 102013016838 * 7/2014 ........... F16H 57/037
EP 1 527 934 A2 5/2005
(Continued)

OTHER PUBLICATIONS

International Search Report dated Oct. 10, 2013 issued in corresponding International patent application No. PCT/SE2013/050588.
(Continued)

*Primary Examiner* — Adam D Rogers
(74) *Attorney, Agent, or Firm* — Ostrolenk Faber LLP

(57) ABSTRACT

A powered axle gear (I) for a motor vehicle. The axle gear can cope with large driving torques and at the same time be accommodated in an axle beam between the vehicle's tractive wheels. The axle gear has a gear housing (10) which accommodates a pinion (40) and a crownwheel (50) for transmission of rotary motion to the vehicle's powered axles (Y1, Y2). To this end, there are two bearings (62, 64), one on each side of the crownwheel (50) and the pinion's centerline (X), with a differential situated between the bearings (62, 64). The bearing (64) situated beyond both the crownwheel (50) and the pinion's centerline (X) has running round it an undivided bearing seat (30) provided with a portion running in the circumferential direction which protrudes over the pinion (40) towards the latter's centerline (X) in a configuration which at least partly overlaps the pinion (40). The invention relates also to a motor vehicle with this axle gear.

6 Claims, 3 Drawing Sheets

(51) Int. Cl.
*B60B 35/18* (2006.01)
*F16H 57/021* (2012.01)
*F16H 57/037* (2012.01)

(52) U.S. Cl.
CPC ..... *F16H 57/037* (2013.01); *F16H 2048/405* (2013.01); *Y10T 74/19665* (2015.01)

(58) Field of Classification Search
CPC .... F16H 57/022; F16C 35/00; F16C 2361/61; Y10T 74/19665; B60B 35/16; B60B 35/163; B60B 35/18
See application file for complete search history.

(56) References Cited

U.S. PATENT DOCUMENTS

| | | | |
|---|---|---|---|
| 3,851,934 A | 12/1974 | Küfner | |
| 4,811,628 A * | 3/1989 | Winkam | F16H 48/08 192/85.53 |
| 5,520,589 A * | 5/1996 | Dewald | F16H 48/08 475/160 |
| 5,806,371 A * | 9/1998 | Hibbler | F16H 48/08 475/230 |
| 7,175,350 B2 * | 2/2007 | Gradu | F16C 35/067 384/557 |
| 7,485,065 B2 * | 2/2009 | Kearney | F16C 25/06 384/537 |
| 7,775,928 B2 * | 8/2010 | Zink | B60K 17/16 475/230 |
| 2005/0245342 A1 | 11/2005 | Pontanari et al. | 475/230 |
| 2006/0276298 A1 | 12/2006 | Rodgers | 475/231 |
| 2008/0020888 A1 | 1/2008 | Kearney | 475/231 |
| 2009/0082162 A1 | 3/2009 | Zink | |
| 2011/0183804 A1 * | 7/2011 | Fabian | F16H 57/037 475/220 |
| 2013/0252776 A1 * | 9/2013 | Nakao | F16H 48/08 475/220 |

FOREIGN PATENT DOCUMENTS

| | | |
|---|---|---|
| EP | 1 591 694 A2 | 11/2005 |
| GB | 2 391 915 | 2/2004 |
| JP | 51-124716 | 10/1976 |

OTHER PUBLICATIONS

Supplementary European Search Report, dated Mar. 4, 2016, issued in corresponding European Patent Application No. EP13797684. Total 2 pages.

* cited by examiner

DRIVEN AXLE GEAR FOR A MOTOR VEHICLE

CROSS-REFERENCE TO RELATED APPLICATIONS

The present application is a 35 U.S.C. §§371 National Phase conversion of PCT/SE2013/050588, filed May 23, 2013, which claims priority of Swedish Patent Application No. 1250544-2, filed May 28, 2012, the contents of which are incorporated by reference herein. The PCT International Application was published in the English language.

TECHNICAL FIELD

The invention relates to a powered axle gear for a motor vehicle. The invention also relates to a motor vehicle with the gear.

BACKGROUND

A rear axle gear is intended to distribute the driving torque to each of a vehicle's tractive wheels by means of a pinion and a crownwheel. The diameter of the pinion largely determines the width of the rear axle gear. In cases where low gear ratios are employed in the rear axle gear to achieve low economical engine operating speeds or where large rear axle gears with hub reduction are employed, the pinion diameter required makes it difficult to accommodate the rear axle gear, e.g. in conjunction with brake installations, on a rear axle beam between the vehicle's tractive wheels and/or between its chassis frame side members.

OBJECT OF THE INVENTION

An object of the present invention is to propose for a motor vehicle a rear axle gear which may cope with large driving torques and at the same time be accommodated in a rear axle beam between the vehicle's tractive wheels.

SUMMARY OF THE INVENTION

This and other objects indicated by the description set out below are achieved by means of a rear axle gear and a motor vehicle of the kind indicated in the introduction.

The invention achieves the objects with a powered axle gear for a motor vehicle in which the bearing situated beyond both the crownwheel and the pinion's centreline has running round it an undivided bearing seat provided with a portion running in the circumferential direction which protrudes over the pinion towards the latter's centreline in a configuration which at least partly overlaps the pinion. The width of the axle gear is thus reduced, making it possible to accommodate larger-diameter pinions in an axle beam between the vehicle's tractive wheels and/or its chassis frame side members. It thus becomes possible to employ stronger axle gears in which larger-diameter pinions are required and hub reductions in conjunction with brake installations have for example also to be accommodated between the tractive wheels.

In one embodiment of the axle gear said bearing seat is arranged to be fastened in said gear housing to transmit both forces and moments to said gear housing. The service life of the axle gear is thus lengthened by the resulting possibility of avoiding obliquity of the differential shaft and consequent sliding in a threaded connection between the bearing seat and the gear housing.

In one embodiment of the axle gear said bearing seat and said gear housing are arranged to cooperate force-absorbingly via opposite support surfaces on opposite sides of the bearing seat's centreline. This results in efficient force transmission from the bearing seat to the gear housing, making it possible at high torque loads to avoid sliding in the connection between the pinion and the crownwheel and obliquity of the bearing seat with bearings and sets of gearwheels which would otherwise put the axle gear's function at risk. The result is an advantageous mark pattern and consequently less risk of gearwheel failure and obliquity of bearings or loss of bearing preloading.

In one embodiment of the axle gear said support surfaces of the bearing seat are situated at the portion of the bearing seat directed towards said pinion, and they thus face towards the support surfaces in the gear housing. The result is greater efficiency of force transmission from the bearing seat to the gear housing.

In one embodiment of the axle gear said support surfaces have an arcuate configuration with curvature in the same direction as the circumference of the pinion. This results in more efficient force transmission from the bearing seat to the gear housing whereby said arcuate configuration allows effective absorption of forces in the gear housing for different load directions, the load direction may vary and the load direction is influenced when travelling for example on uneven surfaces. It also thus becomes possible to design an axle gear which is independent of gear ratio so that the same design may for example be used for different pinion dimensions, resulting in a cost-effective axle gear. The axle gear's tolerance settings are consequently less sensitive with such an arcuate shape of the support surfaces.

DESCRIPTION OF DRAWINGS

The present invention will be better understood by reading the detailed description set out below in conjunction with the attached drawings, in which the same reference notations are used for similar items throughout the various views.

DESCRIPTION OF EMBODIMENTS

Figure 1:
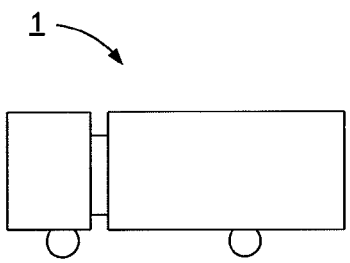
FIG. 1 illustrates schematically a motor vehicle according to an embodiment of the present invention.
Figure 2:
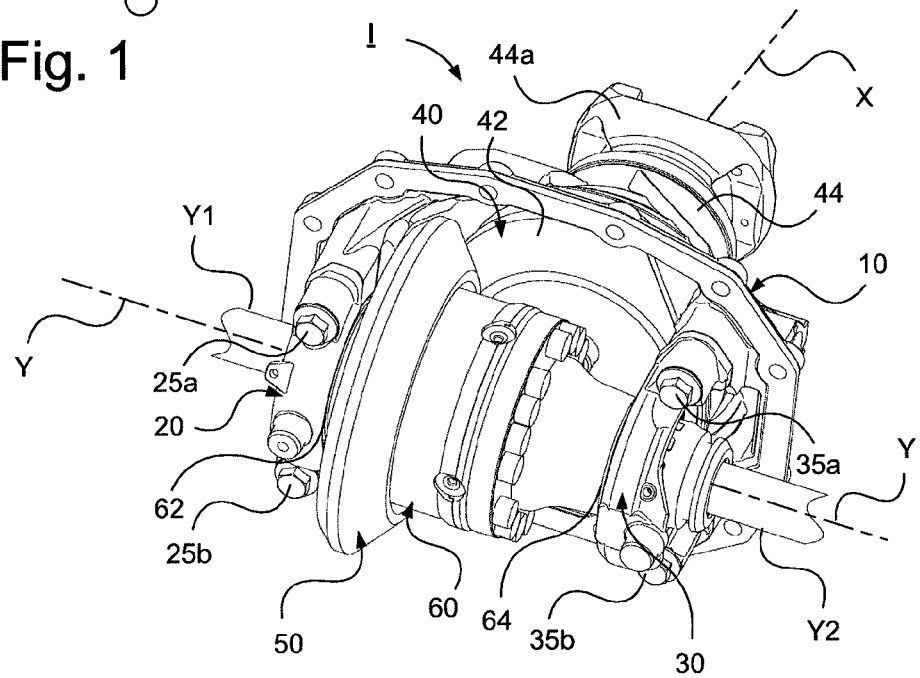
FIG. 2 is a schematic perspective view of a rear axle gear for a motor vehicle according to an embodiment of the present invention.
Figure 3:
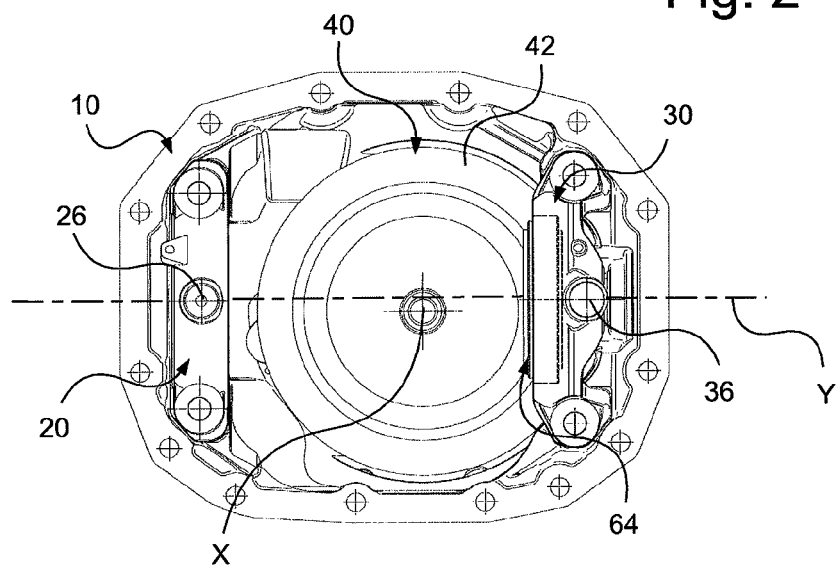
FIG. 3 is a schematic view from the rear of part of the rear axle gear in FIG. 2.

FIG. 1 illustrates schematically a motor vehicle 1 according to an embodiment of the present invention. The vehicle here exemplified is a heavy vehicle in the form of a truck, but might be any suitable vehicle. The vehicle is provided with a rear axle gear I according to the present invention.

The rear axle gear I comprises a pinion 40 with a pinion gearwheel 42 and a pinion shaft 44. The pinion is arranged to rotate about an axis X. The rear axle gear further comprises a crownwheel 50 placed in engagement with said pinion gearwheel 42 to transmit rotary motion from the vehicle's propeller shaft to its thus powered rear axles Y1, Y2.

The crownwheel 50 is arranged to run round a differential housing 60 serving as differential shaft. The differential housing is arranged to accommodate an undepicted differential with which the vehicle is provided to adapt the speed between its tractive wheels via its powered rear axles Y1, Y2 which are arranged to rotate about an axis Y.

The pinion gearwheel 42 and the crownwheel 50 are arranged to rotate at an angle of 90 degrees relative to one another.

The pinion shaft 44 is arranged to run in the vehicle's longitudinal direction. It has at the forward end a propeller shaft connection 44a for connection to the propeller shaft of the vehicle's power train.

The rear axle gear I comprises said gear housing 10 arranged to accommodate said pinion 40 and the crownwheel 50. The gear housing has an annular space to accommodate the pinion's gearwheel 42, with an aperture through which the pinion shaft 44 is arranged to run for connection to the propeller shaft.

The rear axle gear I has a divided bearing cap 20 which is situated on the same side of the pinion shaft 44 as the crownwheel 50 and beyond the crownwheel running round the differential housing 60. The bearing cap is arranged to support a first differential bearing 62 which is connected to the differential housing 60 and arranged to run within the bearing cap. The bearing cap is thus arranged to run round said first bearing 62.

Figure 4:
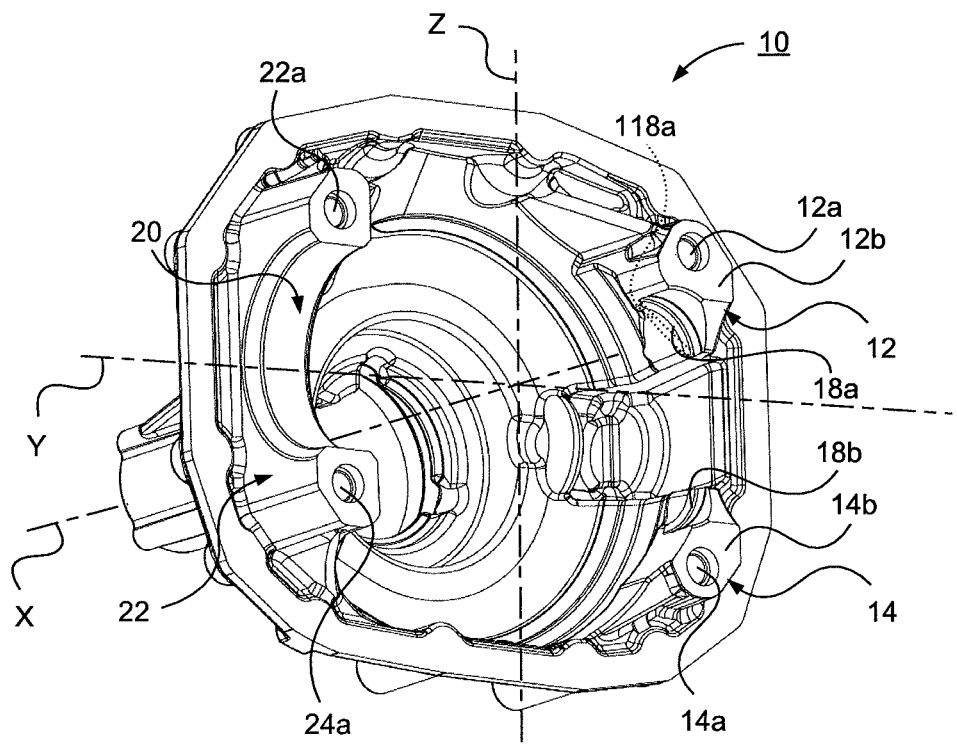
FIG. 4 is a schematic perspective view of a gear housing of the rear axle gear in FIG. 2.

The bearing cap 20 comprises accordingly a semicircular portion 22 which is integrated internally with the gear housing 10 and arranged to protrude from the gear housing in a direction away from the pinion 40, substantially at right angles to, and concentrically about, the axis Y, as depicted in FIG. 4. Said bearing cap portion 22 integrated with the gear housing 10 has upper and lower holes 22a, 24a, preferably threaded, which run substantially in the direction of extent of the pinion shaft 44.

The bearing cap 20 further comprises a separate internal semicircular portion 24 arranged to be fastened by threaded connections 25a, 25b to said portion 22 integrated with the gear housing, via holes running through the separate portion 24 to enable said bearing cap 20 to support said first differential bearing 62. The bearing cap has a spigot portion 26 protruding from the separate portion 24 between the threaded connections 25a, 25b, at right angles to the axis Y.

The rear axle gear I comprises an undivided bearing seat 30 situated beyond both the crownwheel 50 and the pinion shaft 44 on the opposite side of the pinion shaft 44 from the bearing cap 20 which runs round the differential housing 60. The bearing seat is provided to support a second differential bearing 64 which is connected to the differential housing 60 and arranged to run within the bearing seat.

Figure 5:
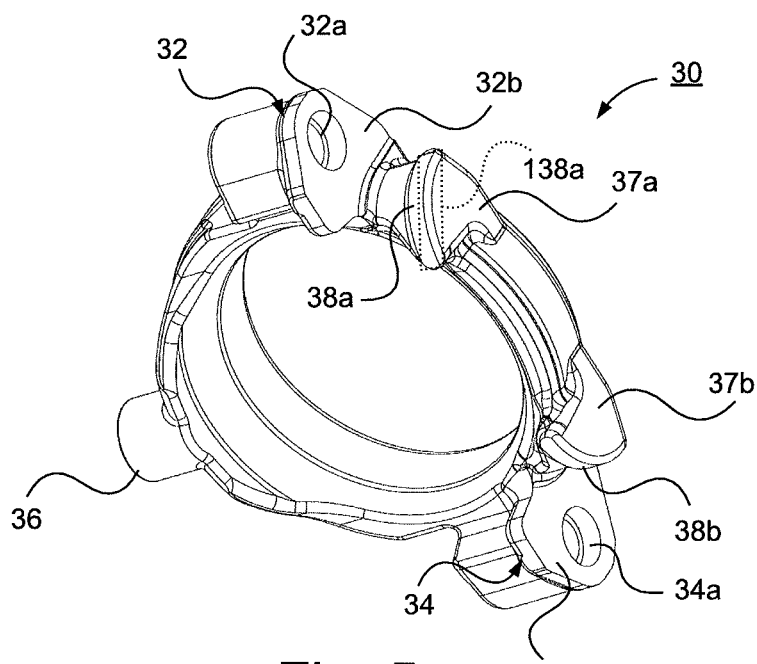
FIG. 5 is a schematic perspective view of a bearing seat of the rear axle gear in FIG. 2.
Figure 6:
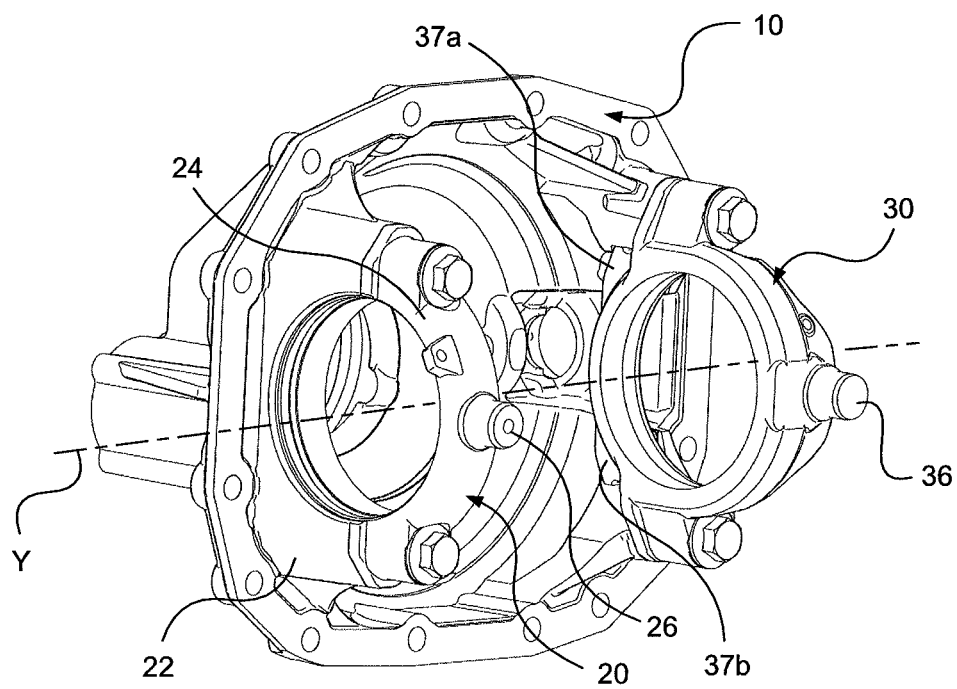
FIG. 6 is a schematic perspective view of a housing configuration of the rear axle gear in FIG. 2.

As may be seen in FIG. 5, the bearing seat 30 has an annular configuration and is internally circular. It has externally a hole 32a running through it in an upper protruding portion 32, and a lower hole 34a running through it in a lower protruding portion 34. Said holes 32a, 34a are arranged to run in substantially the same direction as that of the extent of the pinion shaft 44. Said protruding portions with holes 32a, 34a are situated in the region of the bearing seat 30 which is directed towards the pinion gearwheel 42. Said protruding portions have contact surfaces 32b, 34b situated round said holes. Said holes have close to said contact surfaces a wider portion to accommodate bushings.

The bearing seat 30 is arranged to be fastened to the gear housing 10 by threaded connections 35a, 35b via threaded holes 12a, 14a in the gear housing. Said threaded holes in the gear housing are situated in the portions 12, 14 of the gear housing which protrude in a direction away from the pinion gearwheel. Said protruding portions have contact surfaces 12b, 14b round said holes. Said holes have close to said contact surfaces a wider portion to accommodate bushings.

The bearing seat 30 is arranged to protrude from the gear housing 10 in a direction away from the pinion 40 at right angles to, and concentrically about, the axis Y. The bearing seat has a spigot portion 36 protruding at right angles to the axis Y in the end portion which is directed away from the pinion gearwheel 42.

The bearing seat 30 is provided with a portion running in the circumferential direction which protrudes over the pinion gearwheel 42 towards the centreline X of the pinion gearwheel in a configuration which at least partly overlaps the pinion.

Said threaded holes 12a, 14a in the gear housing 10 are so situated relative to the pinion gearwheel 42 that the upper hole 12a is outside the pinion gearwheel's periphery above the axis Y, and the lower hole 14a is outside the pinion gearwheel's periphery at a distance from the upper hole 12a and below the axis Y, the distance between said holes 12a, 14a being substantially at right angles to the axis Y so as to be at least partly within the pinion gearwheel's periphery at the level of said axis Y. Said second differential bearing 64 is thus arranged to at least partly overlap the pinion gearwheel 42.

Using a bearing seat 30 which is at right angles relative to the pinion gearwheel 42 so that its annular configuration and consequently the second differential bearing 64 supported by the bearing seat 30 at least partly overlap the pinion gearwheel reduces the width of the rear axle gear I compared with having a bearing cap also on the opposite side of the crownwheel 50. It thus becomes possible to accommodate pinions 40 with pinion gearwheels 42 with larger diameters in the rear axle beam between the vehicle's tractive wheels and/or its chassis frame side members. This makes it possible to employ stronger rear axle gears in which larger-diameter pinions are required and hub reductions in conjunction with brake installations have for example also to be accommodated between the tractive wheels.

Said bearing seat 30 is arranged to be fastened in said gear housing 10 to transmit both forces and moments to said gear housing. Said gear housing has support surfaces 18a, 18b. Said bearing seat has support surfaces 38a, 38b intended to be opposite to the gear housing's support surfaces 18a, 18b. Said bearing seat and said gear housing are arranged to cooperate force-absorbingly via said opposite support surfaces 18a, 18b, 38a, 38b on opposite sides of the bearing seat's centreline Y. Said support surfaces 38a, 38b are at the bearing seat's portion directed towards said pinion and thus face towards the gear housing's support surfaces 18a, 18b.

Said support surfaces 18a, 18b of the gear housing comprise an upper support surface 18a situated above the axis Y and a lower support surface 18b situated below the axis Y. The upper support surface 18a is close to and below said upper hole 12a, and the lower support surface 18b is close to and above said lower hole 13a and at a distance from the upper support surface 18a.

Said support surfaces 18a, 18b of the gear housing have an arcuate configuration with curvature in the same direction as the circumference of the pinion gearwheel 42. The upper support surface 18a is consequently at right angles to the axis Y and runs arcuately from a level above the axis Y and obliquely upwards with the same curvature as the circumference of the pinion gearwheel. The lower support surface 18b is consequently at right angles to the axis Y and runs arcuately from a level below the axis Y and obliquely downwards with the same curvature as the circumference of the pinion gearwheel. Said support surfaces 18a, 18b of the gear housing are situated nearer to the pinion gearwheel than the holes 12a, 14a for connections to the bearing seat.

Said support surfaces 38a, 38b of the bearing seat 30 comprise an upper support surface 38a situated above the axis Y and a lower support surface 38b situated below the axis Y. Said support surfaces of the bearing seat are situated in the end region of portions 37a, 37b facing towards the pinion gearwheel 42 and are nearer to the pinion gearwheel than said portions 32, 34 with holes 32a, 34a.

Said support surfaces 38a, 38b of the bearing seat 30 have an arcuate configuration with curvature in the same direction as the circumference of the pinion gearwheel 42. The upper support surface 38a is consequently at right angles to the axis Y and runs arcuately from a level above the axis Y and obliquely upwards with the same curvature as the circumference of the pinion gearwheel. The lower support surface 38b is consequently at right angles to the axis Y and runs arcuately from a level below the axis Y and obliquely downwards with the same curvature as the circumference of the pinion gearwheel.

The upper support surface 38a of the bearing seat 30 is situated close to, and arranged to run along, the upper support surface 18a of the gear housing 10. The lower support surface 38b of the bearing seat is situated close to, and arranged to run along, the lower support surface 18b of the gear housing.

The shape of the support surfaces 18a, 18b, 38a, 38b may be any appropriate to the transmission of forces from the bearing seat 30 to the gear housing 10 for load absorption. The shape of the gear housing's support surfaces is preferably such that the bearing seat is supported via its respective support surfaces in the direction of the axis Y and in the direction Z at right angles to the axis Y and the axis X, i.e. in the respective upward and downward directions.

In an alternative variant the shape of the gear housing's support surfaces is such as to substantially resemble the shape of the hull of a boat. The respective support surface 118a of the gear housing depicted in dotted line form in FIG. 4 is an example of the shape of an angled plane arranged to run from a level above the axis Y and obliquely upwards, and the undepicted other support surface correspondingly runs arcuately from a level below the axis Y and obliquely downwards. In this variant the support surfaces 138a of the bearing seat have the corresponding shape of an angled plane depicted in dotted line form in FIG. 5 and arranged to abut against respective support surfaces of the gear housing.

The bearing seat 30 is arranged to be fastened to the gear housing 10 by means of said threaded connections 35a, 35b in said holes 32a, 34a so that said contact surfaces 32b, 34b of said protruding portions 32, 34 of the bearing seat abut against said contact surfaces 12b, 14b of said protruding portions 12, 14 of the gear housing. An interface G is thus formed between said contact surfaces 12b, 32b, as illustrated in FIG. 7.

Figure 7:
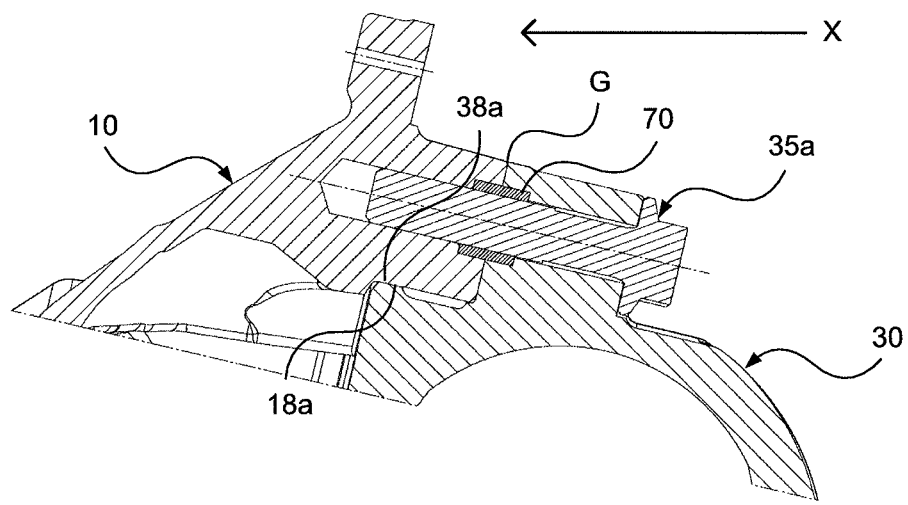
FIG. 7 is a schematic cross-sectional view of part of the rear axle gear in FIG. 2, showing the connection between the gear housing and the bearing seat, according to an embodiment of the present invention.

The rear axle gear I further comprises bushings 70 depicted in FIG. 7 which are placed round said threaded connection 35a in said wider portions of the holes close to said interface G in order to absorb forces between the bearing seat 30 and the gear housing 10.

Fitting the rear axle gear I involves initially a clearance fit between the support surfaces 18a, 18b, 38a, 38b of the bearing seat 30 and the gear housing 10, which clearance fit is then reduced on the basis of tolerance settings and is subsequently put into contact when the gear housing is fitted in the undepicted rear axle beam. The undepicted rear axle beam has a hole to accommodate said spigot portion 36 of the bearing seat 30, and a hole to accommodate said spigot portion 26 of the bearing cap 20. When the gear housing is being fitted in the rear axle beam, said spigot portion 36 is arranged to be inserted in said holes, which are so configured that when the spigots are inserted in them said bearing seat 30 and bearing cap 20 are pressed together so that correct preloading of the respective bearings is achieved. At the same time, the bearing seat's support surfaces 38a, 38b are also pressed against the gear housing's support surfaces 18a, 18b so that contact is achieved between the support surfaces.

During operation, the on-load force transmitted from the pinion 40 to the crownwheel 50 will be absorbed by the bearing 64 in the bearing seat 30 and be transmitted from the bearing seat to the gear housing 10, which load distribution takes place in such a way that threaded connections and bushings 70 absorb the incipient first load, and higher loads cause said support surfaces 18a, 18b, 38a, 38b between the bearing seat 30 and the gear housing 10 to be put into contact and distribute the load to the gear housing.

Said support by the bearing seat 30 and the gear housing 10 will minimise sliding and obliquity of the bearing seat when heavy loads occur during operation. An arcuate shape of said support surfaces 18a, 18b, 38a, 38b as described above results in a rear axle gear which can via the support surfaces effectively transmit loads acting in different directions which may change with power train load and axle load. The support surfaces distribute the reaction force from the bearing seat's bearing 64 to the gear housing 10 to minimise obliquity of the differential shaft 60.

Using an undivided bearing seat according to the present invention allows the rear axle gear to be designed in a way which is more efficient with regard to space.

A rear axle gear I for a motor vehicle is described above. The present invention may be employed on any suitable powered axle gear.

The above description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order best to explain the principles of the invention and their practical applications, and thereby enable one skilled in the art to understand the invention for different embodiments and with the various modifications appropriate to the intended use.

The invention claimed is:
1. A powered axle gear for a motor vehicle comprising:
 a pinion configured for conveying drive energy from a propeller shaft of the vehicle, and a crownwheel configured for transmitting rotary motion from the pinion to powered axles of the vehicle;
 a gear housing configured to accommodate the pinion and the crownwheel;
 a first bearing on one side of the crownwheel and a second bearing on the other side of the crownwheel, the second bearing being located on an opposite side of an axial centerline of the pinion from a side of the axial centerline of the pinion on which the crownwheel is located;
a differential housing situated between the bearings; and
an undivided bearing seat located around the second bearing, the undivided bearing seat having a configuration of a complete annulus and having internally a complete circular shape;
wherein:
the bearing seat includes a first portion running in a circumferential direction which protrudes over the pinion towards the axial centerline of the pinion in a configuration which at least partly overlaps the pinion, all of the bearing seat being located on a single side of the axial centerline of the pinion; and
the bearing seat is connected to the gear housing by second protruding portions of the bearing seat, protruding portions of the gear housing, and connectors, each of the connectors passing through a corresponding hole in the second protruding portions of the bearing seat and through a corresponding hole in the protruding portions of the gear housing.

2. The powered axle gear according to claim 1, wherein the bearing seat and the gear housing are located and configured to cooperate force-absorbingly in directions (Y,Z) at right angles to the axial centerline of the pinion via opposite support surfaces of the bearing seat and the gear housing on opposite sides of an axial centerline of the bearing seat, and the support surfaces of the bearing seat are situated at a portion of the bearing seat directed towards the pinion and face towards the support surfaces of the gear housing.

3. A powered axle gear for a motor vehicle comprising:
a pinion configured for conveying drive energy from a propeller shaft of the vehicle, and a crownwheel configured for transmitting rotary motion from the pinion to powered axles of the vehicle;
a gear housing configured to accommodate the pinion and the crownwheel;
a first bearing on one side of the crownwheel and a second bearing on the other side of the crownwheel, the second bearing being located on an opposite side of an axial centerline of the pinion from a side of the axial centerline of the pinion on which the crownwheel is located;
a differential housing situated between the bearings; and
an undivided bearing seat located around the second bearing;
wherein:
the bearing seat includes a portion running in a circumferential direction which protrudes over the pinion towards the axial centerline of the pinion in a configuration which at least partly overlaps the pinion, all of the bearing seat being located on a single side of the axial centerline of the pinion;
the bearing seat is configured and located to be fastened in the gear housing in order to transmit both forces and moments to the gear housing;
the bearing seat and the gear housing are located and configured to cooperate force-absorbingly in directions (Y,Z) at right angles to the axial centerline of the pinion via opposite support surfaces of the bearing seat and the gear housing on opposite sides of an axial centerline of the bearing seat;
the support surfaces of the bearing seat are situated at a portion of the bearing seat directed towards the pinion and face towards the support surfaces of the gear housing; and
the support surfaces of the bearing seat and of the gear housing have respective arcuate configurations with a curvature in the same direction as a circumference of the pinion.

4. The powered axle gear according to claim 1, wherein the powered axle gear is a rear axle gear of the motor vehicle.

5. A motor vehicle provided with the powered axle gear according to claim 1.

6. The powered axle gear according to claim 1, wherein the undivided bearing seat supports the second bearing.

* * * * *